UNITED STATES PATENT OFFICE.

PHILO B. SHELDON, OF PRATTSBURG, NEW YORK.

COMPOSITION FOR DESTROYING INSECTS INJURIOUS TO FRUIT-TREES.

Specification forming part of Letters Patent No. 25,281, dated August 30, 1859.

*To all whom it may concern:*

Be it known that I, PHILO B. SHELDON, of Prattsburg, in the county of Steuben and State of New York, have invented a new and useful Composition for Destroying Grubs and Borers in Fruit-Trees; and I do hereby declare that the following is a full and exact description thereof, and of the method of using the same.

My invention is designed to act as a preventive of the injurious effects of the insects commonly known as the "fruit-tree borer" and other insects that infest the bark and roots of trees, by exterminating and destroying both the insect and its larvæ. It is composed of the following ingredients: potash, four ounces; common salt, sixteen ounces; copperas, four ounces; blue vitriol, two ounces; saltpeter, one ounce. The potash is dissolved in a sufficient quantity of water to form the whole into a paste, and the other ingredients are added, having first been pulverized finely to enable them to dissolve the more readily. An equal quantity, by weight, of hard soap is then added and the whole thoroughly compounded together.

The proportions may be varied to some extent without materially destroying the effect; but I prefer to use them in about the relative quantities above stated, as securing the best result.

It is applied by inclosing a few ounces in a cloth and placing the same in the crotch of the tree, should it be so formed as to admit of it, or by rolling the cloth containing it and tying or otherwise securing it around the body of the tree near the lower limbs. The rains which fall upon it are absorbed by the cloth, and coming in contact with the composition gradually soften and dissolve it and cause it to flow or course its way down the trunk. In this manner it finds its way into all the holes and crevices which have been formed by insects or occasioned by the natural roughness of the bark. It insinuates itself underneath the fibers of the outer bark, and in all places where eggs or larvæ are deposited, acting as a wash, and the more effectually from the application being a slow and protracted one. Care should be taken in applying it enveloped in cloth to so spread and arrange it that it will in dissolving become diffused over the whole surface of the trunk. Repeated wettings cause it to flow down until it reaches the root, and the caustic nature of the ingredients causes the immediate destruction of all insects, of whatever species, that infest trees, as well as their eggs and larvæ. A sufficient quantity will penetrate the holes of those grubs that have already entered the body of the tree to cause their destruction, and by the destruction of the eggs reproduction ceases and the evil is removed.

The nature of the ingredients used is favorable to the growth and healthy condition of the tree, and seems to soften and benefit the bark, while on becoming absorbed in the soil around the roots it is a valuable fertilizer. The application should be repeated at intervals during the season of insect life to insure complete success, though the mode of application is such that its effects are greatly prolonged and the material is not wasted.

What I claim as my invention, and desire to secure by Letters Patent, is—

Combining and employing the ingredients herein described, in substantially the method and proportions set forth, for the purpose of destroying borers and other insects on fruit-trees.

PHILO B. SHELDON.

Witnesses:
S. J. ALLIS,
J. FRASER.